US011805002B2

(12) United States Patent
Bruun et al.

(10) Patent No.: US 11,805,002 B2
(45) Date of Patent: Oct. 31, 2023

(54) RETRIEVING AND PROVISIONING ENTITIES BASED ON INHERITANCE

(71) Applicant: HEWLETT PACKARD ENTERPRISE DEVELOPMENT LP, Houston, TX (US)

(72) Inventors: Peter Michael Bruun, Alleroed (DK); Andres Duebi, Bern (CH); Juan Postlbauer Correas, Las Rozas (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 103 days.

(21) Appl. No.: 17/531,372

(22) Filed: Nov. 19, 2021

(65) Prior Publication Data
US 2023/0164020 A1    May 25, 2023

(51) Int. Cl.
| | |
|---|---|
| H04L 41/0273 | (2022.01) |
| H04L 41/0806 | (2022.01) |
| H04L 41/50 | (2022.01) |
| H04L 41/5041 | (2022.01) |

(52) U.S. Cl.
CPC ...... *H04L 41/0286* (2013.01); *H04L 41/0806* (2013.01); *H04L 41/5041* (2013.01); *H04L 41/5058* (2013.01)

(58) Field of Classification Search
CPC ............. H04L 41/5058; H04L 41/5041; H04L 41/0806; H04L 41/0286
See application file for complete search history.

(56) References Cited

U.S. PATENT DOCUMENTS

| | | | |
|---|---|---|---|
| 10,027,596 B1* | 7/2018 | Harwood | ................ G06F 16/86 |
| 2010/0070448 A1* | 3/2010 | Omoigui | ............. H01L 27/1463 |
| | | | 706/55 |

(Continued)

FOREIGN PATENT DOCUMENTS

WO   WO-2017117876 A1   7/2017

OTHER PUBLICATIONS

Brogi, A. et al., "TosKer: A Synergy Between TOSCA and Docker for Orchestrating Multicomponent Applications," Software: Practice and Experience 48.11, Aug. 2018, 23 pgs., https://www.researchgate.net/publication/326953263_TosKer_A_synergy_between_TOSCA_and_Docker_for_orchestrating_multicomponent_applications_TosKer_A_synergy_between_TOSCA_and_Docker.

(Continued)

*Primary Examiner* — Nicholas P Celani
(74) *Attorney, Agent, or Firm* — Sheppard Mullin Richter & Hampton LLP

(57) ABSTRACT

Systems and methods are provided for deriving, based on a service for which an entity is to be selected or provisioned, a query to determine, from candidate nodes, one or more node instances within a topology that fulfill one or more criteria provided by one or more classes; and an additional criterion. The candidate nodes represent respective entities. The evaluation of the query includes determining the classes that satisfy or fulfill the one or more criteria, determining one or more second classes that match, or inherit from, the one or more classes, partially evaluating the additional criterion within respective contexts of the candidate nodes and each of the one or more second classes, based on the partial evaluation, processing the query to determine the node instances, and provisioning or presenting an entity represented by a node instance of the node instances to the service.

13 Claims, 9 Drawing Sheets

(56) References Cited

U.S. PATENT DOCUMENTS

2016/0191414 A1* 6/2016 Cimprich ............ H04L 41/0806
    709/226
2020/0264858 A1 8/2020 Li

OTHER PUBLICATIONS

ETSI, "Zero-touch Network and Service Management (ZSM); Means of Automation," ETSI GR ZSM 005, V1.1.1, May 2020, 70 pages, https://www.etsi.org/deliver/etsi_gr/ZSM/001_099/005/01.01.01_60/gr_ZSM005v010101p.pdf.

Hewlett Packard Enterprise Development LP, "HPE Service Provisioner," Agility and Automation Accelerating Service Innovation, Data Sheet, Rev. 5, Jun. 2020, 7 pgs., https://assets.ext.hpe.com/is/content/hpedam/documents/4aa5-3000-3999/4aa5-3165/4aa5-3165enw.pdf.

Selea, T. et al., "The CloudLightning Approach to Cloud-user Interaction," Proceedings of the 1st Int'l Workshop on Next Generation of Cloud Architectures, Apr. 23, 2017, 5 pgs., https://dl.acm.org/doi/pdf/10.1145/3068126.3068130.

* cited by examiner

RETRIEVING AND PROVISIONING ENTITIES BASED ON INHERITANCE

BACKGROUND

Virtual machines are increasingly being implemented to deliver network functions such as directory services, routers, firewalls, domain name system (DNS), caching, network address translation (NAT), and load balancers. One manifestation of the virtual machines includes software applications, such as virtual network functions (VNFs), which replace physical network functions (PNFs) of legacy network applications. An infrastructure, such as a network functions virtualization (NFV) infrastructure, may encompass hardware and software to support the VNFs by provisioning and orchestrating the VNFs. For example, the NFV infrastructure may allocate resources such as computing, storage, and networking resources among the VNFs. The VNFs may be scaled to provide throughput and performance depending on a size of a system of platform.

BRIEF DESCRIPTION OF THE DRAWINGS

The present disclosure, in accordance with one or more various examples, is described in detail with reference to the following figures. The figures are provided for purposes of illustration only and merely depict examples.

Figure 1A:
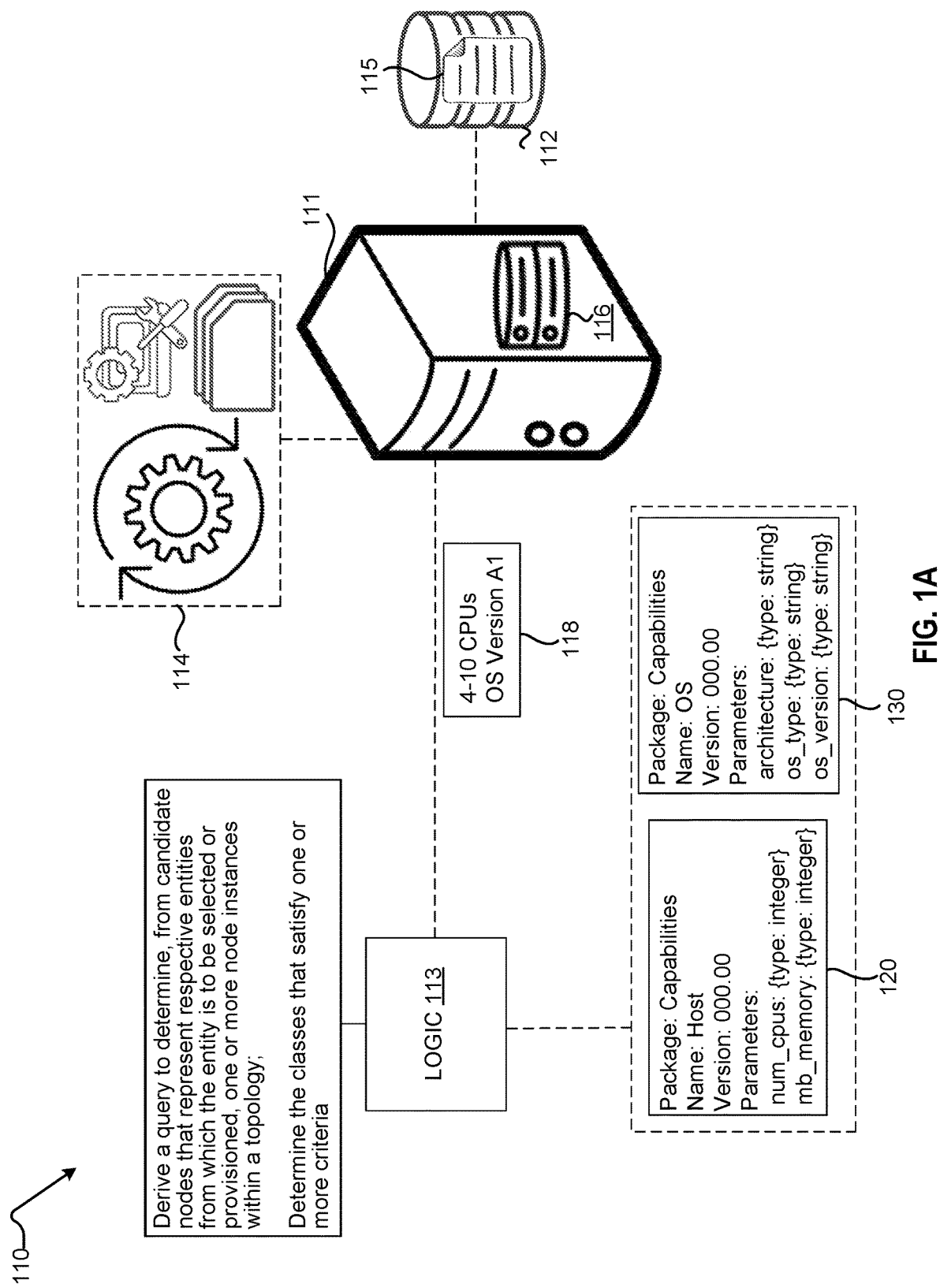
FIG. 1A is an example illustration of a computing component that evaluates a query to resolve dangling requirements, according to examples described in the present disclosure.

The figures are not exhaustive and do not limit the present disclosure to the precise form disclosed.

DETAILED DESCRIPTION

Data platforms may orchestrate, manage, and/or automate network and edge computing services. Such data platforms may be utilized to deploy services, such as physical network and Virtual Network Function (VNF) services, particularly in rapidly growing fields such as telecommunications and next generation communications. A data platform (hereinafter "platform") may support, for example, 5G and Internet of Things (IoT) evolution by synchronizing previous environments which may otherwise be largely siloed. Functionalities of the data platform may include defining, designing, and programming the platform, such as assets, resources, or entities (hereinafter "entities") within the platform, together with processes and policies. As will be described later, the entities may encompass, but are not limited to, software, hardware, and/or firmware, physical or virtual entities such as routers, switches, route-reflectors, firewalls, load-balancers, ports, gateways, and/or datacenters, described in a language that supports inheritance.

In order to orchestrate network and edge computing services, the platform, or a functionality within the platform, may process queries accurately and efficiently. Such processing of queries may encompass searching for entities, which may fulfill particular capabilities or satisfy some conditions. Capabilities may include, as non-limiting examples, values (e.g., parameters or numbers which may signify properties or capabilities), names, capacities, and/or indications relating to properties of and/or tasks performed by the entities. Generally, the capabilities may be dynamic or static and have forms of, or originate from, constants, user inputs, synchronization and data-load of values from other entities, databases, and inventories, uploads from the platform or entities, and/or computed, predicted, or evaluated values or expressions which may be dependent on values of other parameters. As an example implementation, the capabilities may include a number of computing processing units (CPUs), processing power, and/or memory sizes of physical or virtual computing resources such as servers or hosts. As another exemplary implementation, the capabilities may include a predicted amount of processing power available, and/or a predicted memory space available. The entities may be represented by node instances which are organized, stored, indexed, and/or updated within one or more databases and/or caches within the platform.

Databases of network resources and services have expanded to sizes, amounts, and complexities that are out of range for classical database searches, due in part to the rapid increases of data creation and consumption. In particular, annual data creation increased from 1.2 zettabytes (trillion gigabytes) to an estimated 60 zettabytes from 2010 to 2020. Data is expected to proliferate at ever increasing rates due in part to the rise of remote work and remote applications. In 2025, an estimated 180 zettabytes of data will be created. In order to support such an increase in data creation, larger database sizes have been utilized. However, current mechanisms may be ineffective in searching or querying large databases, thereby causing delays in fulfilling queries and bottlenecks in processing speeds. For example, many searches in databases involve repetitive or redundant queries that consume time and computing resources.

As a result, the extent and frequency of network access and connectivity is ever growing, and has approached a scale at which manual provisioning has become infeasible. Thus, current mechanisms to search for node instances that fulfill the queries may be limited and unsuited for large databases. In particular, searching techniques may not be targeted towards specific portions of databases that include large proportion of hits, and may fail to omit or eliminate node instances that have previously been searched. Such limitations may result in constraints in speeds of processing queries, which may cause a bottleneck in providing services and may impair service assurance policies to ensure a pre-defined service quality level. Additionally, current mechanisms to query databases may be incompatible with different computing architectures and/or platforms. For example, some mechanisms are written in a language that follows multiple inheritance, but a platform may have a programming framework that supports single inheritance without supporting multiple inheritance.

Examples described herein address these challenges by utilizing a computing component, which may be implemented on or be part of a server. Capabilities of the server may be represented in a manner that involves expressions using inheritance between classes, descriptors, or types (hereinafter "classes"). As a non-limiting example, if a particular query calls for an entity, such as a computing resource having a specified number or range of CPUs, the computing component may search a database accessible by the computing component for one or more node instances that satisfy such a specified number or range, within candidate nodes. Capabilities of the candidate nodes here may be described using classes which specify a number of range of CPUs as a criteria. The query may be statically evaluated against capabilities of each of the candidate nodes. Furthermore, multiple inheritance, in which multiple classes are searched and evaluated within a single query, may be supported. Within the classes may be definitions, declarations, and other data used to specify or instantiate the classes. In some examples, the classes may be embedded within or include files. In such a manner, these solutions may enhance service assurance initiatives and fulfill queries more efficiently as databases increase in size.

These efforts to improve searching of large databases may further initiatives to automate services in networks such as telecommunications and next-generation networks. Without such automation, the current paradigm may not be able to support the increasing number of network nodes, technologies including modern 5G and legacy network technologies, software components, devices, users, and network slices in telecommunications networks. Efforts in automation may enable, for example, orchestrating resources at a mass market scale based on predicted queries of individual users and providing rules at different levels of abstraction to realize demands in features, speed, and performance.

FIG. 1A is an exemplary illustration of a computing environment 110 that processes queries, such as queries for entities having particular capabilities, within a platform 114. For example, the computing component may internally detect, generate, or formulate a query to find or determine one or more entities that fulfill certain capabilities in a context of a service for which the query is processed. The determination of the one or more entities involves evaluating expressions according to inheritance among classes associated with the expressions. These entities may encompass, as non-limiting examples, any of computing resources, and physical or virtual entities such as routers, switches, route-reflectors, firewalls, load-balancers, ports, gateways, and datacenters. As previously alluded to, the platform 114 may deploy services, such as physical network and Virtual Network Function (VNF) services, particularly in rapidly growing fields such as telecommunications and next generation communications. The deployment of these services may be regulated by policies, such as rules or protocols to instantiate or de-instantiate configurations, conditions, requirements, constraints, attributes, and/or queries regarding entities within the platform 114. These policies may further include mechanisms to provision, maintain, deploy, test, delete, and/or retire the entities. As a non-limiting example, the platform 114 may be programmed using Topology and Orchestration Specification for Cloud Applications (TOSCA) templates. A programming framework of the platform 114 may support single inheritance, for example, as exhibited by Java, or multiple inheritance, for example, as exhibited by Dynamic Service Descriptor (DSD) or C++. In some examples, if the platform 114 has a programming framework that supports single inheritance without supporting multiple inheritance, the platform 114 may further include logic 113 that may include programming features to also support multiple inheritance in order to augment the existing programming framework.

In FIG. 1A, the computing environment 110 may include a computing component 111 that includes one or more hardware processors that carry out tasks to implement or supplement policies of the platform 114. For example, the computing component 111 may include a server, such as a remote server. The computing component 111 may include logic 113 that implements instructions to carry out functionalities of the computing component 111. For example, the computing component 111, through the logic 113, may transform subsets of templates within the platform 114 to a different language. For instance, the computing component 111 can transform TOSCA templates of the platform 114, or other script or code of the platform 114 that supports inheritance, to DSD, in order to enhance functionalities defined within the platform 114. For example, the transformation of certain templates may provide functionalities not previously supported by the platform 114, such as multiple inheritance among classes, rather than the single inheritance otherwise supported by the original templates, while evaluating queries.

The computing component 111 may maintain a database 112 which organizes and stores tasks performed by and/or capabilities (hereinafter "capabilities") of entities of the platform 114, as represented by node instances. These capabilities may refer to capabilities of hardware, software, and/or firmware components. For example, the database 112 may organize particular entities based on classes, examples of which are provided in FIGS. 1A-1C. To facilitate a search based on certain criteria embedded in a query, node instances representing the entities in the database 112 may be indexed by an index 115, which may be integral to the database 112. In some examples, a cache 116 may be embedded within or otherwise integrated into the computing component 111. The cache 116 may be a part of an internal memory structure within the computing component 111 that represents a subset of data from the database 112, and/or data of different databases or services than those in the database 112, for expedited access by the computing component 111. The computing component 111 may initially create, delete, and/or modify (hereinafter "modify") classes associated with entities represented in the cache 116. Thus, the data stored within the cache 116 can be quickly accessed by the computing component 111 when performing searches based on queries. When processing queries, the computing component 111 may perform a search within the cache 116 initially, and if the search within the cache 116 fails to return adequate hits and/or if criteria embedded in the queries specifies further ordering of results, the computing component 111 may proceed to perform the search within the database 112.

In some examples, if the cache 116 contains modifications that have not yet been persisted to the database 112, a query performed against the database 112 may not incorporate those modifications. In particular, a node instance within the database 112 may appear to satisfy the criteria of the query, but a corresponding node instance within the cache 116 may actually fail to satisfy the criteria when evaluated against the cache 116 due to modifications corresponding to the node instance that have not been persisted to the database 112. In other scenarios, a node instance within the database 112 may not appear to satisfy the criteria, but corresponding node instances within the cache 116 may actually satisfy the criteria. In yet other scenarios, a corresponding node instance within the cache 116 may have been added or deleted. However, those additions or deletions may not have propagated to the database 112. Thus, in an event that a query performed against the cache 116 yields conflicting or different results compared to a query specifying the same criteria performed against the database 112, the computing component 111 may determine that the results of the query performed against the cache 116 takes precedence due to the cache 116 incorporating more updated modifications, additions, or deletions.

In some examples, the computing component 111 may perform receiving, formulating, generating, and/or processing currently unfulfilled queries, which may be referred to as dangling requirements, within a context of a service that may be part of a network. In some examples, the queries may not be received externally but rather internally derived or formulated by the computing component 111. The derivation of the query may be based on one or more parameters of the service. As alluded to above and as will be elucidated in FIGS. 1A-1C, the queries to be processed by the computing component 111 may include computing capabilities to be satisfied by entities in the platform 114. The queries may be automatically detected or generated internally by the computing component 111. The queries may be evaluated within a context of a service that is querying for an entity. In an alternative example, if a query is initiated, triggered, or generated by a client device, in order to be processed by the computing component 111, the query indicates a node within a service topology. Otherwise, if the query fails to indicate such a node, then the query may be unprocessable by the computing component 111. Such a node represents a service for which an entity is being sought, as opposed to the aforementioned node instances, which represent the entities. Properties of a node within the service topology may be static (e.g., fully-defined as part of a class definition) or dynamic (e.g., varying, for example, depending on an entity being requested).

As a specific illustrative example, a database host may be a service that is querying for an entity. The query may specify a specific number or range of central processing units (CPUs). Illustrative examples of a static property of the database host may include a total amount of memory or a total amount of processing power within the database host. An illustrative example of a dynamic property may include an available amount of memory at a given time, which may depend on other processes that are being run on the database host at that given time.

In general, the capabilities of the entities, which reside within the service topology, may include parameters, numbers, names, capacities, properties, and/or indications. The capabilities or properties of the entities, or of node instances that represent the entities, may also be dynamic or static. Static properties may be fully-defined as part of a class definition, and may include, as non-limiting examples, a fixed number of memories, a fixed amount of processing power, and/or and fixed sizes of memories. Meanwhile, dynamic properties may include parameters that could be variable for each node instance. One example of a dynamic property includes a current status of whether or not an entity is available to be deployed, or whether the entity is currently in use by another service. Some dynamic properties may be stored within the database 116 such that they are represented by the index 115, and if a query specifies such dynamic properties, the computing component 111 may quickly retrieve node instances within the database 112 that match or satisfy the query using the index 115. When a query is evaluated, the computing component 111 may initially perform filtering on the properties that are known, including the static and dynamic properties of the node within the service topology, and the static properties of the node instances that are fully-defined. The computing component 111 may perform filtering on the dynamic properties that are represented by the index 115, and filters remaining candidate nodes against remaining criteria specified by the query.

In some examples, a query may be directed to one or more entities that have a number or a range of computing processing units (CPUs), processing power, and/or memory sizes. The query may, additionally or alternatively, specify criteria regarding particular properties of operating systems or software distributions such as operating system architectures, operating system distributions, availability status of a particular entity or portion thereof, and/or network access controls of the entities. These aforementioned capabilities may further be expressed as logic that indicates a relationship between the parameters, expressions, functions, or conditions. For example, logic expressions such as "and," "or," or "exclusive or" can be used in construction of queries. The capabilities embedded within queries may be evaluated, in whole or in part, against candidate nodes to determine whether capabilities of the respective candidate nodes satisfy the criteria specified by the queries.

One example expression to evaluate queries against candidate nodes within the database 112 and/or the cache 116 is: "@eq(SP, $_.p),"
where "$_.p" indicates capabilities of a candidate node that represents an entity being sought for and expressed by the query and "$p" indicates a property of a node within the service topology for which an entity is being queried (e.g., one or more parameters of the service). Each of "$p" and "$_.p" may include parameters and/or functions, such as logic expressions. In particular, if the node within the service topology represents a repository, then "$p" may represent an upper limit of a storage size of the repository. "$_.p" may represent a size that can be supported by a candidate node. An expression "0($_.p>$p)" may be evaluated to return candidate nodes that can support a size greater than the upper limit of the storage size of the repository. Upon further specifying that instances of returned candidate nodes may be sorted on a basis of "$p," with the smallest first, and upon specifying that one instance is to be returned, then the returned result will be a candidate node that, of the returned candidate nodes, has a smallest storage size that still exceeds the upper limit of the storage size of the repository.

In some examples, a query may specify a multiplicity of entities that can be combined (e.g., collaborate) to satisfy capabilities specified in the query and perform a task. The entities that collaborate may be of same types or different types. For example, entities may include routers, gateways, core-networks, and/or access-networks. In this example, one or more routers can be combined to perform a task. Alternatively, one router can be combined with a gateway to perform a task. Many variations are contemplated. In some examples, the computing component 111, and/or the platform 114, may model interactions and relationships between the entities that collaborate to determine or predict a group of entities that would collectively perform a task. For example, a gateway and a controller of the gateway may be modeled in the computing component 111 and/or the platform 114 to control flow of network data from one network to another network.

Queries processed by the computing component 111 may include types indicating one or more names of classes or other descriptors to be implemented by matching results, which are selected or determined from candidate nodes, a filter indicating a criterion or expression to be evaluated as either true or false for each candidate node, sorting that indicates an order of the matching results, a limit that indicates a number of matching results to be returned, and a context indicating a node within the service topology for which the query is being processed. In some examples, the filter may refer to values of parameters in the node and compare those values to corresponding values of the candidate nodes representing the entities. In some examples, if a limit is "x," then at most "x" results may be returned. The evaluation of queries may utilize previously defined parent classes which declare or define capabilities of the candidate nodes.

For example, a query may specify a candidate node that represents an entity having a specified value or range of memory sizes such as 32 megabytes (MB). The computing component 111 may search for classes associated with node instances in the database 112 and/or the cache 116 that include, or inherit, definitions relating to the memory sizes. For example, if a particular class associated with a node instance is a child class of a parent class that defines or specifies that instances within the parent class include computing resources of 32 MB memory, then instances within the particular class would automatically be evaluated as "true." As another example, if a particular class inherits from a parent class, or includes a definition or characteristic that instances of a parent class have between 8 and 16 MB of memory, then instances of the particular class would automatically be evaluated as "false." In both the aforementioned scenarios, because the particular class is automatically evaluated as either "true" or "false, the computing component 111 may refrain from or skip searching that particular class, thereby conserving time and computing power.

Figure 1B:
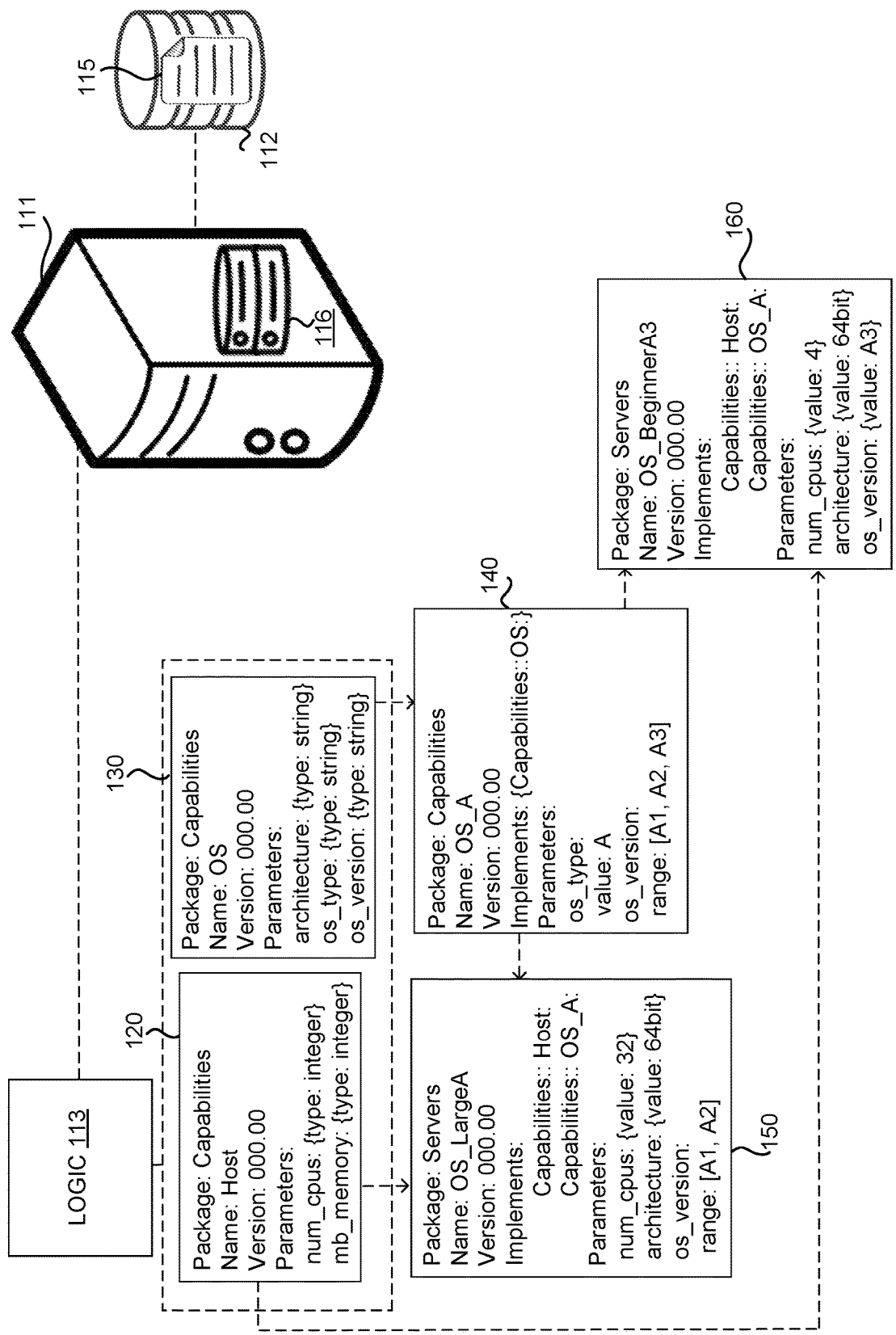
FIG. 1B is an example illustration of a computing component that determines second classes (e.g., child classes) that inherit from the classes, according to examples described in the present disclosure.
Figure 1C:
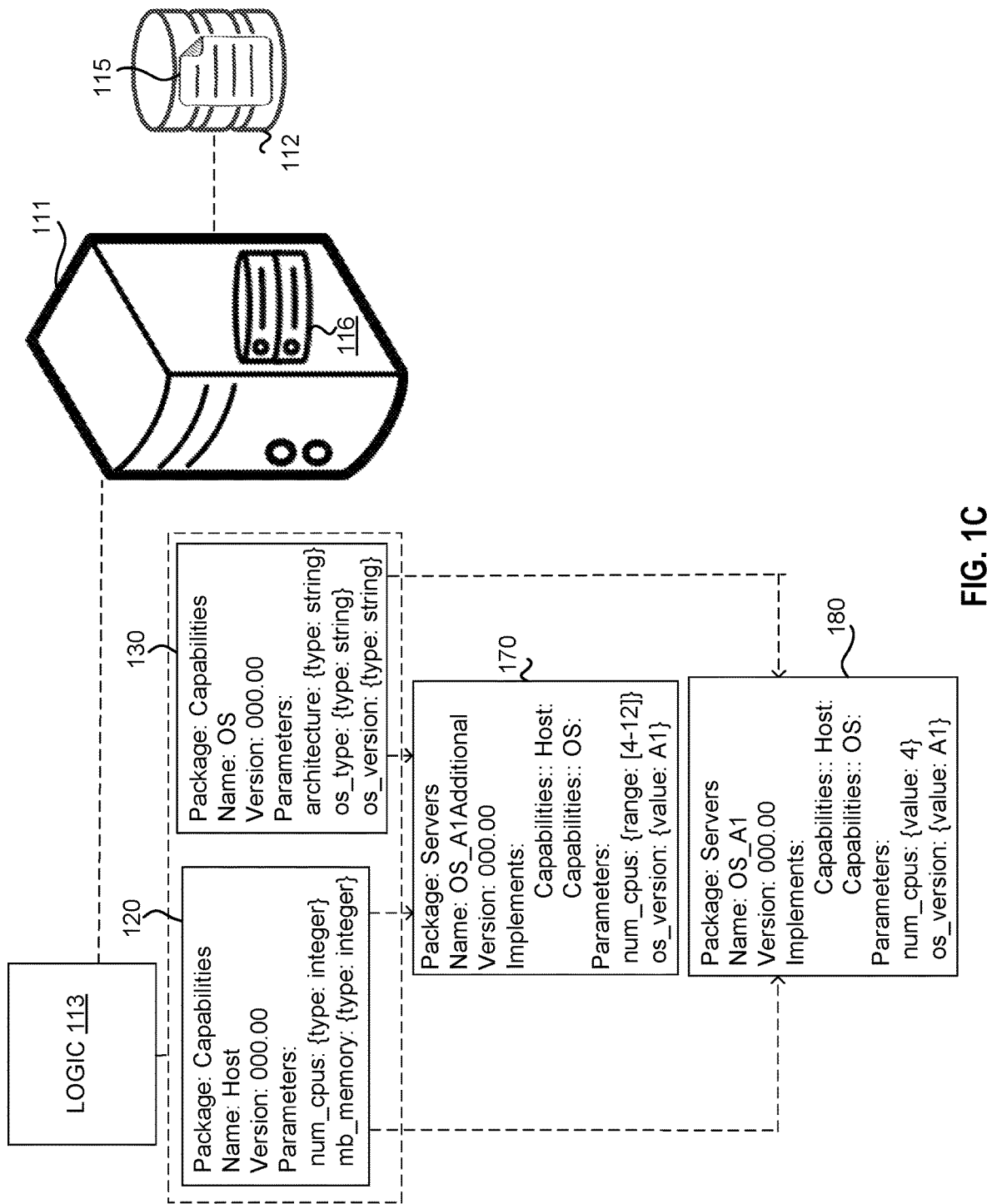
FIG. 1C is an example illustration of a computing component that determines second classes that inherit from the classes, which fulfill some or an entirety of the criteria of the query, according to examples described in the present disclosure.

FIGS. 1A-1C illustrate a particular example in which the computing component 111 evaluates a query using inheritance among classes. In the example of FIG. 1A, the computing component 111 may generate or derive a query 118 for an entity that satisfies capabilities of a number of CPUs being between two parameters or values, in this example, 4 and 10, inclusive, and an operating system version being A1 (e.g., a version 1 of an operating system of type A). Although the query 118 specifies an "and" condition in which both capabilities are to be satisfied in order for a result to be returned and the query 118 to be deemed satisfied, a query may alternately specify an "or" condition. In an "or" condition, a result in which one of multiple capabilities, which correspond to alternatives within the "or" condition, is satisfied, would still be returned and deemed to satisfy the query 118, even if other capabilities are unsatisfied. The query 118 may further specify a filter or a filter expression according to which the query 118 is conducted. In some examples, the logic 113 may transform the criteria indicated by the query 118 into a filter expression. An exemplary filter expression may include "@and (@between ($_.num_cpus, 4, 10), @eq($_.os_version, $A1))," according to a language, such as a domain specific language like the DSD language. The "$" notation may indicate a reference to a parameter. The filter expression is evaluated to determine whether a candidate node has between 4 and 10 CPUs, indicated by "$_.num_cpus,") and whether the candidate node has an operation system version, indicated by "$_.os_version," that matches "A1." The logic 113 may return any computing entity which results in the filter expression evaluating to true.

In the aforementioned manner, the logic 113 of the computing component 111 may conduct a search within the cache 116 and/or the database 112 for any computing entity that has between 4 and 10 CPUs and also has an "A1" operating system version. The logic 113 may initially determine any classes that include criteria of a number of CPUs and/or an operating system version. For example, in FIG. 1A, the logic 113 may determine that classes 120 and 130, under a classification of "capabilities" and designated as "host" and "operating system (OS)," respectively, include criteria of a number of CPUs and an operating system version, as indicated by the "num_cpus" under parameters of the class 120 and the "os_version" under parameters of the class 130. Thus, the class 120, designated as "host," includes instances of entities of which numbers of CPUs and an amount of memory are specified as capabilities. The class 130, designated as "OS," includes instances of entities of which architectures, operating system types, and operating system versions are specified as capabilities. As will be described in FIG. 1B, the logic 113 may determine further child classes or subclasses that inherit from the class 120 and/or the class 130 to determine whether or not those further classes or subclasses include additional, more specific criteria regarding the number of CPUs and an operating system version, which would further streamline the search for entities.

The logic 113 may further perform unit-based comparisons and arithmetic. For example, the logic 113 may perform arithmetic on entities of different units, such as between kilobytes (Kb) and megabytes (Mb), and/or convert units to be consistent between capabilities specified in the query 118 and capabilities specified within classes.

In FIG. 1B, the logic 113 may determine that a class 140, under a classification of "capabilities" and designated as "OS_A," inherits from the class 130, as indicated by "Implements: {Capabilities::OS:}." In other words, the class 140 includes definitions and declarations specified under the class 130. Furthermore, the class 140 may specify additional or more specific capabilities beyond those specified in the class 130. In particular, the class 140 further specifies that the operating system is of a type "A" and that a range of operation system versions includes "A1," "A2," and "A3." Here, "A1" may indicate a type "A" and a version "1" of the type "A." In other words, any node instances representing entities classified within the class 140 of "OS_A" have an operating system of a type "A" and any of "A1," "A2," or "A3" versions. Any entity having an operating system besides a type "A" operating system, and any entity having an operating system version besides "A1," "A2," or "A3" are not part of the class 140.

Next, the logic 113 may determine that a class 150, designated as "OS_LargeA" under a classification of "servers," inherits from both the class 140 and the class 120, as indicated by "Implements: Capabilities::Host:" and "Capabilities::OS_A:" Thus, the class 150 includes definitions and declarations specified under the classes 140 and 120, thereby indicating multiple inheritance. The class 150 further specifies that the number of CPUs is 32, the architecture is of a 64-bit type, and the operating system version falls under one of A1 or A2. In other words, instances within the class 150 have 32 CPUs, a 64-bit CPU architecture, and an operating system version of "A1" or "A2." An instance that fails to satisfy any of the aforementioned specified parameters would not belong in the class 150. Thus, the logic 113 would determine that because the class 150 specifies 32 CPUs as a parameter, then no instances within the class 150 could have between 4 and 10 CPUs, as specified by the query 118. The logic 113 would then skip or refrain from searching within the class 150. In some implementations, the logic 113 would not skip or refrain from searching additional classes that inherit from the class 150, if the additional classes are permitted to change parameters or values inherited from the class 150. However, in some implementations, if the additional classes are restricted from changing parameters or values inherited from the class 150, then the logic 113 may skip or refrain from searching the additional classes as well. As a result of skipping or refraining from searching within the class 150, time and resources of the computing component 111 are conserved because the computing component 111 would otherwise have searched within the class 150. The logic 113 would evaluate the query 118 against the class 150 to be "false," indicating that no matches exist within the class 150.

Next, the logic 113 may determine that a class 160, designated as "OS_BeginnerA3" under a classification of "servers," inherits from both the class 140 and the class 120, as indicated by "Implements: Capabilities::Host:" and "Capabilities::OS_A:" Thus, the class 160 includes the definitions and declarations specified under the classes 140 and 120, thereby indicating multiple inheritance. The class 160 further specifies that the number of CPUs is 4, the architecture is of a 64-bit type, and the operating system version is A3. In other words, node instances that represent entities within the class 160 have four CPUs, a CPU architecture of a 64-bit type, and an operating system type of "A3." Thus, the logic 113 would determine that because the class 160 specifies an operating system type of "A3," then no node instances within the class 160 could have an operating system type of "A1," as specified by the query 118. The logic 113 would then skip or refrain from searching within the class 160, along with classes that inherit from the class 160, thereby conserving time and resources of the computing component 111, that would otherwise have searched within the class 160. The logic 113 would evaluate the query 118 against the class 160 to be "false," indicating that no matches exist within the class 160.

In addition, because the classes 150 and 160 both inherit from multiple parent classes, 120 and 140, the classes 150 and 160, may be prohibited from overriding any definitions and declarations inherited from the parent classes. However, if, somehow, a definition or declaration were overridden, resulting in multiple inheritance from two conflicting definitions or declarations in two different classes, a criteria may be established to determine which class to inherit from. For example, the criteria may include selecting a class having more specific parameters or criteria, or alternatively, less specific parameters or criteria. Parameters indicating a particular value or ranges may be considered to be more specific compared to parameters devoid of a particular value or ranges, while parameters indicating a particular value (e.g., 4 CPUs) may be considered to be more specific compared to parameters that specify a particular range (e.g., 4-32 CPUs) without specifying a particular value.

When the logic 113 evaluates the query 118 against the class 140, a returned value may be neither false nor true, indicating that some instances within the class 140 may satisfy the query 118. The logic 113 may further search within the class 140 and/or additional second classes that inherit from the class 140.

FIG. 1C illustrates an implementation in which the logic 113 evaluates the query 118 against classes to be "true" or at least partially "true." In FIG. 1C, classes 170 and 180, designated as "OS_A1Additional" and "OS_A1," respectively, under a classification of "servers," both inherit from the classes 120 and 130, as indicated by "Implements: Capabilities::Host:" and "Capabilities::OS:" Thus, the classes 170 and 180 include definitions and declarations specified under the classes 120 and 130. The class 170 further specifies that the number of CPUs is in a range between 4 and 12, and that the operating system version is "A1." Therefore, the logic 113 evaluates the query 118 against the class 170 to be partially true because the criteria of the operating system version being "A1" is satisfied while the criteria of the number of CPUs being 4 may be satisfied by some instances within the class 170. The logic 113 may thus evaluate the criteria of the number of CPUs being 4 within the class 170, by retrieving node instances within the class 170 that satisfy a condition that the number of CPUs is 4, without evaluating the criteria of the operating system version being "A1" because the latter is already satisfied. The logic 113 may utilize the criteria of the number of CPUs being 4 as a filter expression or condition to determine instances within the class 170 that satisfy the query 118. The logic 113 may conduct a search within the cache 112. If enough matches are retrieved within the cache 112 and no sorting conditions or rules are specified, then a search of the database 116 may be skipped. Otherwise, the logic 113 may conduct a search within the database 116.

Meanwhile, the class 180 further specifies that the number of CPUs is 4, and that the operating system version is "A1." Therefore, the logic 113 evaluates the query 118 against the class 180 to be true because the criteria of the operating system version being "A1" and the number of CPUs being 4 is satisfied. Every instance within the class 180 would satisfy the query 118, so the logic 113 may skip searching within the class 180.

Figure 2A:
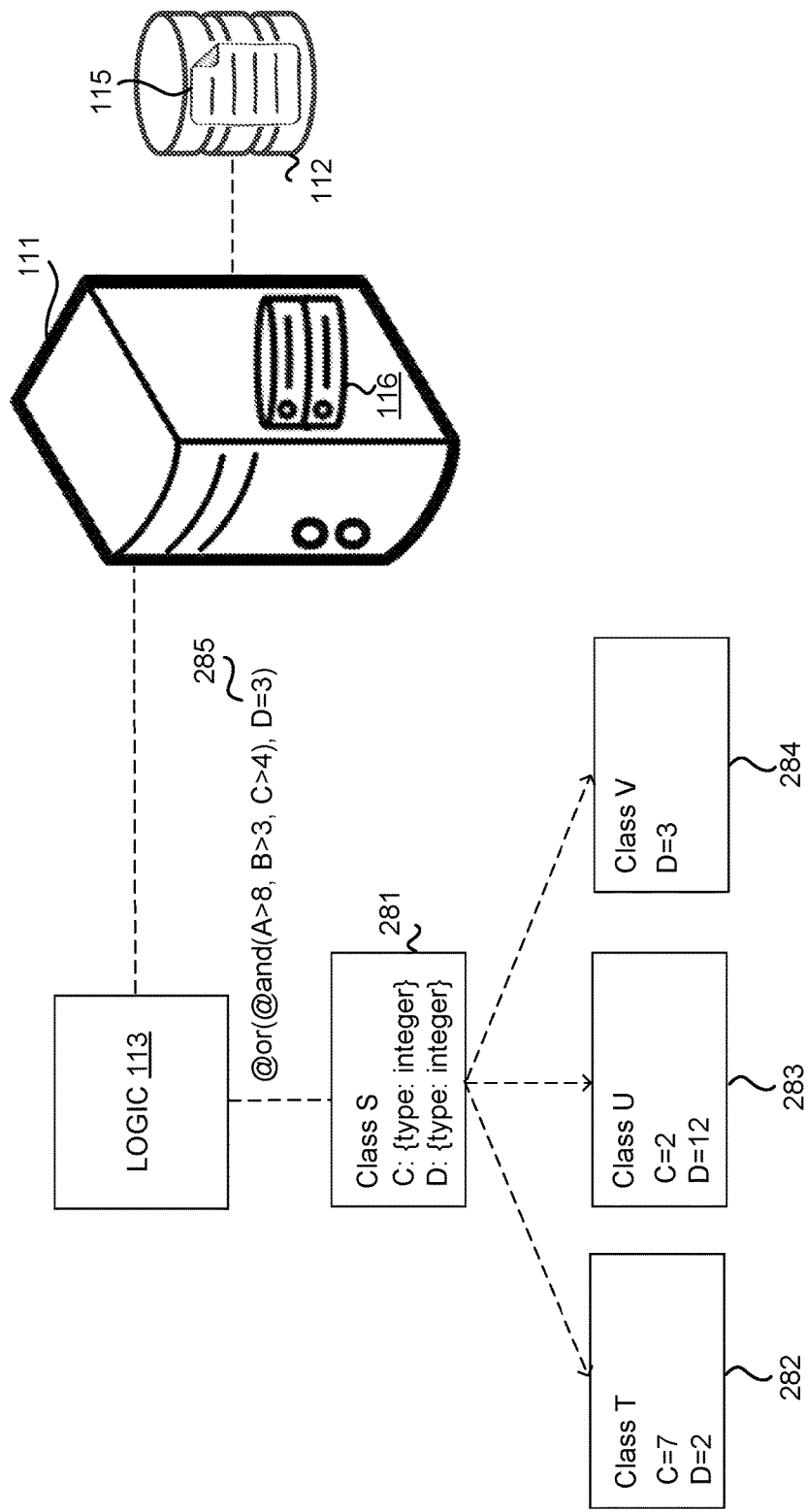
FIG. 2A is an example illustration of a computing component that evaluates logical expressions which include logical operators.

FIG. 2A illustrates a concept of partial evaluation, in which a semantic evaluation of expressions is carried out while accounting for a manner in which logical operators "and" and "or" are handled. For each logical operator within an expression, the logic 113 evaluates the expression to determine whether a value is capable of being determined. The logic 113 may conduct a partial evaluation using a criterium (e.g., additional criterion) 285, to search for conforming instances within a class 281 and second classes 282, 283, and 284, which are child classes of the class 281, and inherit from the class 281. The criterium 285 indicates that if one of two conditions, "D=3," or "(A>8, B>3, C>4)," are met by a node instance, then that node instance conforms to the criterium 285. The logic 113 determines whether to evaluate expressions conjunctively or disjunctively. For example, the expression "@and(A>8, B>3, C>4)" is evaluated conjunctively, while the two expressions "D=3" and "(A>8, B>3, C>4)" are evaluated disjunctively. Thus, when evaluating the class 282, a sub-criterium "C>4" is met but the sub-criterium that "D=3" is unmet. Therefore, the criterium 285 is met if both "A>8" and "B>3," but not satisfied if either "A≤8" or "B≤3," so a partial evaluation to be evaluated is reduced to "@and (A>8, B>3)." To evaluate this partial evaluation, the logic 113 may determine whether A and B are columns in the database 112, for example, whether they are indexed. If A is a column within the database 112 but B is not, then a database query may return records in which "A>8." The logic 113 may further filter the returned records according to "B>3."

Meanwhile, when the logic 113 evaluates the class 283 according to the criterium 285, a subcondition that "C>4" is unmet, as is a condition that "D=3." Thus, querying of the class 283 may be skipped because instances within the class 283 would violate the criterium 285. When the logic 113 evaluates the class 284 according to the criterium 285, a subcondition that "D=3" is already satisfied so instances of the class 284 satisfy the criterium 285, and querying of the class 284 may also be skipped.

Figure 2B:
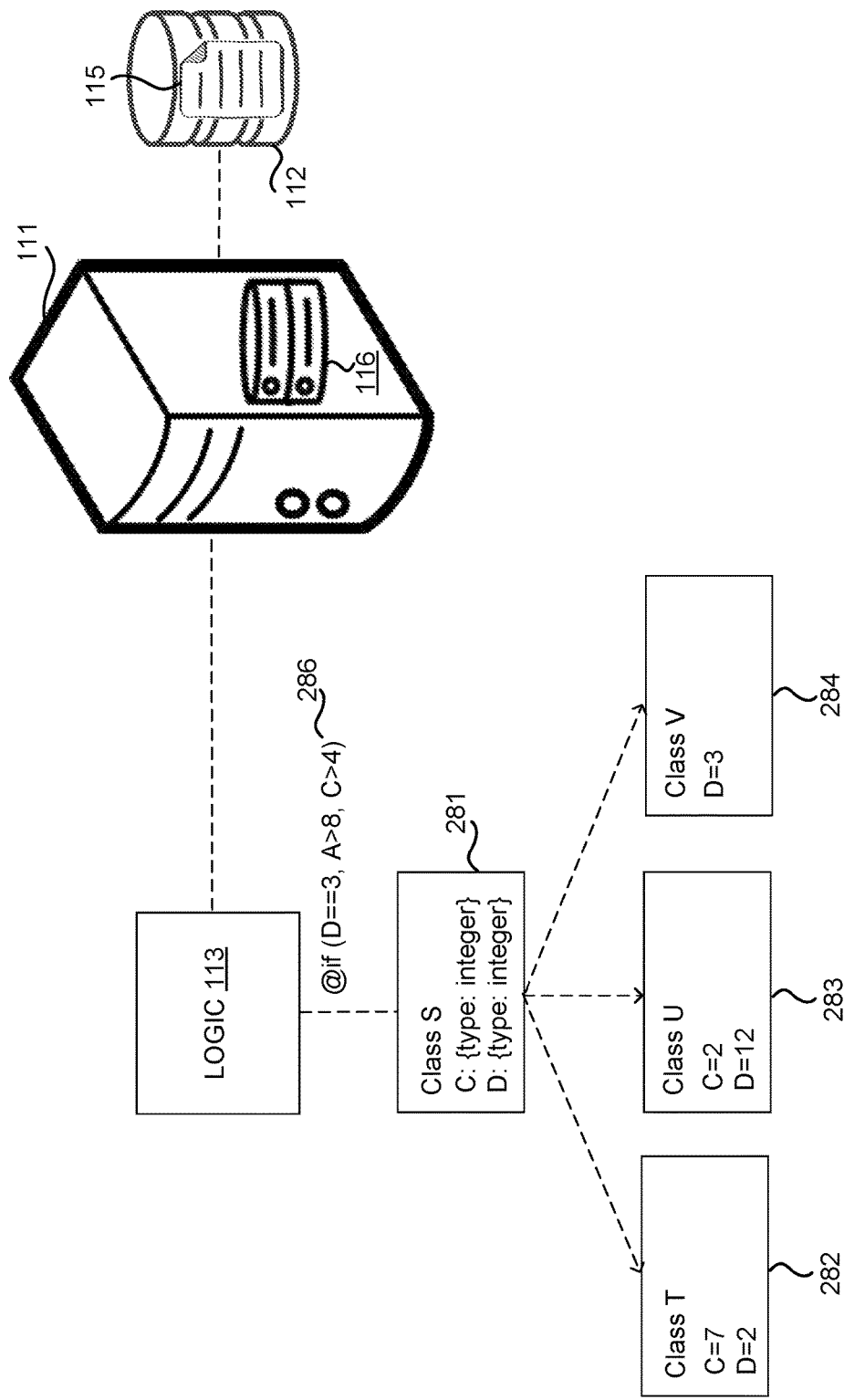
FIG. 2B is an example illustration of a computing component that evaluates logical expressions that include conditional statements.

FIG. 2B further illustrates a concept of partial evaluation, in which a semantic evaluation accounts for a manner in which a logical function "if" handles its arguments. The function "if" may be partially evaluated based on current values of parameters within classes. In particular, the logic 113 may conduct a partial evaluation using a criterium (e.g., additional criterion) 286, to search for conforming instances within a class 281 and second classes 282, 283, and 284, which inherit from the class 281. The criterium 286 indicates that if the first argument "@if (D==3)" is true, then the second argument "(A>8)" is returned, else the third argument "(C>4)" is returned, equivalent to an if-then-else statement. Thus, in an event that "@if (D==3)" is true, as in the case of the second class 284, then the criterium 286 is reduced to an expression "(A>8)," meaning that a value of C is irrelevant to whether the criterium 286 is satisfied, but that a value of A is relevant. Instances within the second classes 284 would be queried based on the value of A, and not based on the value of C. In an event that "@if (D==3)" is false, as in the case of the classes 282 and 283, then the criterium 286 is reduced to an expression "(C>4)," meaning that a value of A is irrelevant to whether the criterium 286 is satisfied, but that a value of C is relevant. Therefore, the classes 282 and 283 would be queried based on the value of C, but not based on the value of A. The class 282 satisfies the reduced expression "(C>4)" while the class 283 violates the reduced expression "(C>4)." As follows, the criterium 286 may be simplified by partial evaluation to reduce or eliminate queries in each of the classes 282 and 283.

In general, as applied to in the previous FIGS. 1A, 1B, 1C, 2A, and 2B, for example, partial evaluation may be expressed as a function "PEval: E→C→E," wherein E is a class of expressions and "C=P→V" is an environmental context that binds, or links, parameter names in P to values in V. In mathematical terms, partial evaluation may be expressed as:

"Eval (PEval(e)(c1))(c2)=Eval(e)(c2+c1)," wherein e indicates an expression and c1 and c2 indicate environments in C having disjointed domains. In the above, "c2+c1" indicates that parameters in both c2 and c1 are bound or linked to the expression e.

In some examples, partial evaluation generally carries out a semantic evaluation of expressions given partial input, in which some parameters are defined or known while other parameters are undefined or unknown. Therefore, partial expression may simplify or reduce an original expression, in particular, the portions corresponding to the defined or known parameters. Via partial expression, a determination may be more easily made as to whether a value of each function can be evaluated, and/or an extent to which a value of each function can be evaluated. Within the contexts illustrated in FIGS. 1A, 1B, 1C, 2A, and 2B, partial evaluation may reduce expressions to their non-constant parts which depend on information found in the database 112. For example, certain conditions or portions thereof may evaluate to a fixed value, such as "true" or "false," regardless of information found in the database 112. The conditions or portions that evaluate to a fixed value may be replaced with that fixed value or a representation of that fixed value to simplify the expressions.

In some examples, the logic 113 may evaluate functions, arguments, or expressions via lazy evaluation, or call-by-need, which skips evaluation of functions until values are actually used. In other examples, the logic 113 may evaluate functions, arguments, or expressions via eager evaluation, in which even unused functions are evaluated. For example, some expressions could potentially return undefined or infinite values. The function $$"PEval\left("if\left(x == 0, 0, \frac{1}{x}\right)"\right)(\{x = 0\})"$$

returns 0 under lazy evaluation because $$\frac{1}{x}$$

is not returned. However, under eager evaluation, the aforementioned function returns an undefined value or an error.

Figure 3:
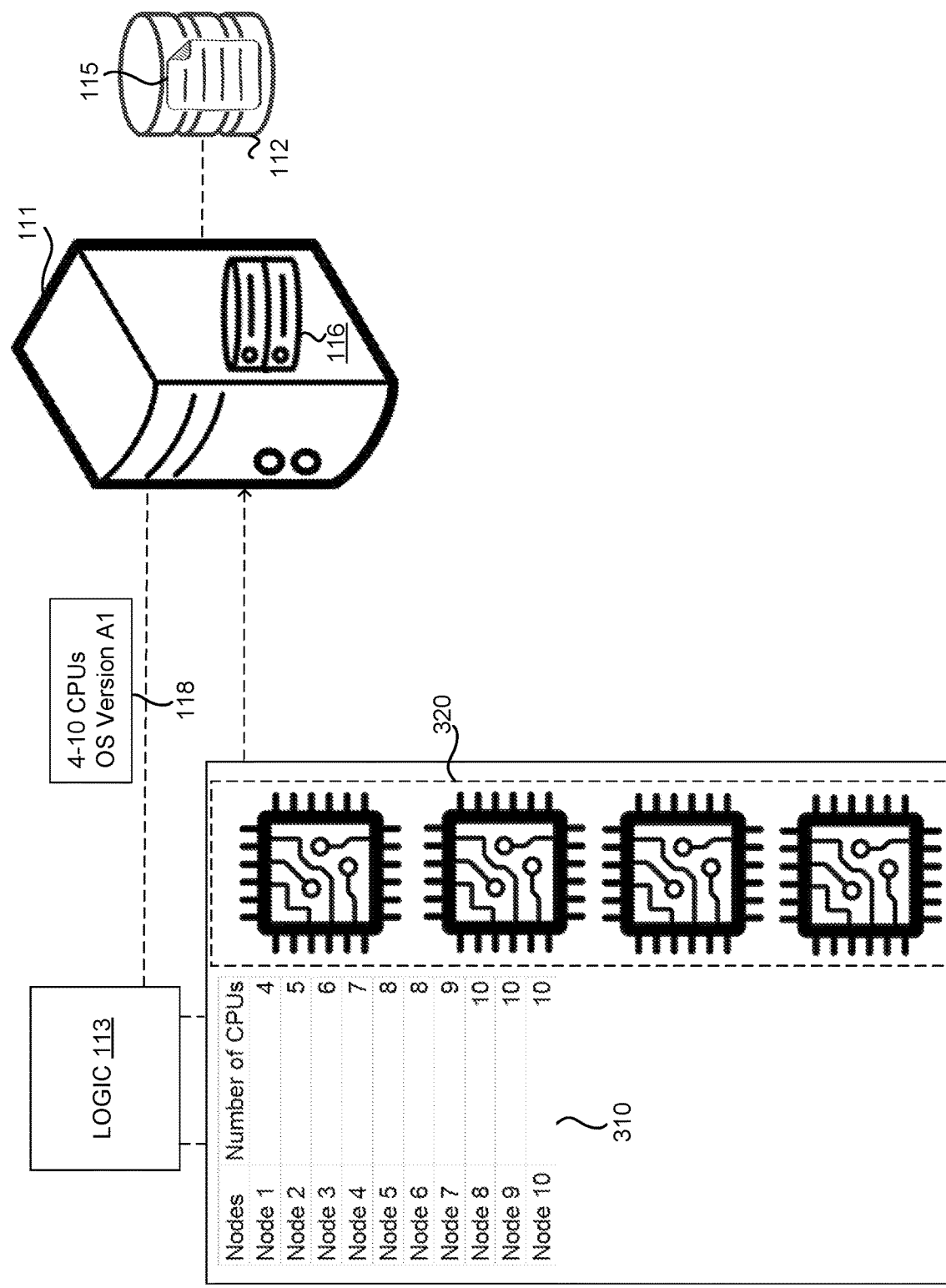
FIG. 3 is another example illustration of a computing component that provisions an entity determined from the query, according to examples described in the present disclosure.

FIG. 3 illustrates an example provisioning of results of the query 118. In FIG. 3, the logic 113 may return some or an entirety of results that satisfy the query 118. A number of results and/or an order, if any, by which the results are displayed, may be specified by a portion of the query that indicates an order of the matching results and a limit that may indicate a maximum number of matching results, as part of the query 118 and/or filter expression generated by the logic 113. In the exemplary implementation of FIG. 3, ten results organized according to ascending number of CPUs may be displayed, according to results 310. Nodes within the results 310 may represent entities that satisfy the query 118. In some examples, the results 310 may be limited to node instances representing currently available entities that are not otherwise in use or reserved. Alternatively, the results 310 may include node instances representing both available and unavailable entities, unless an availability of an entity is specified as a criteria.

In FIG. 3, one or more entities 320 represented by one of the node instances within the results 310 may be selected, configured, and/or provisioned by the logic 113. The selection of one or more entities 320 may include 4 CPUs as illustrated in FIG. 3. Here, a single entity may be selected based on considerations such as an amount of computing power or resources such as a least number of CPUs. The selected computing entity 320 may be reserved by or delegated to the service, such as the database host, for which the query was evaluated. In particular, the service, such as the database host, may transmit data packets to the computing component 111 to authenticate the service. Once authenticated, the service may receive data packets indicating such from the computing component 111.

In some examples, a node instance representing the selected entity 320 may be indicated as unavailable or would not be returned as a result even if the selected entity 320 satisfied a criterium of another query while the selected computing entity 320 is reserved by or delegated to the service. For example, if another query specified a criteria that includes 4 CPUs and an operating system version of "A1," which the selected computing entity 320 would have otherwise satisfied, the selected computing entity 320 would not be listed as a match for that other query while being reserved by or delegated to the service.

Figure 4:
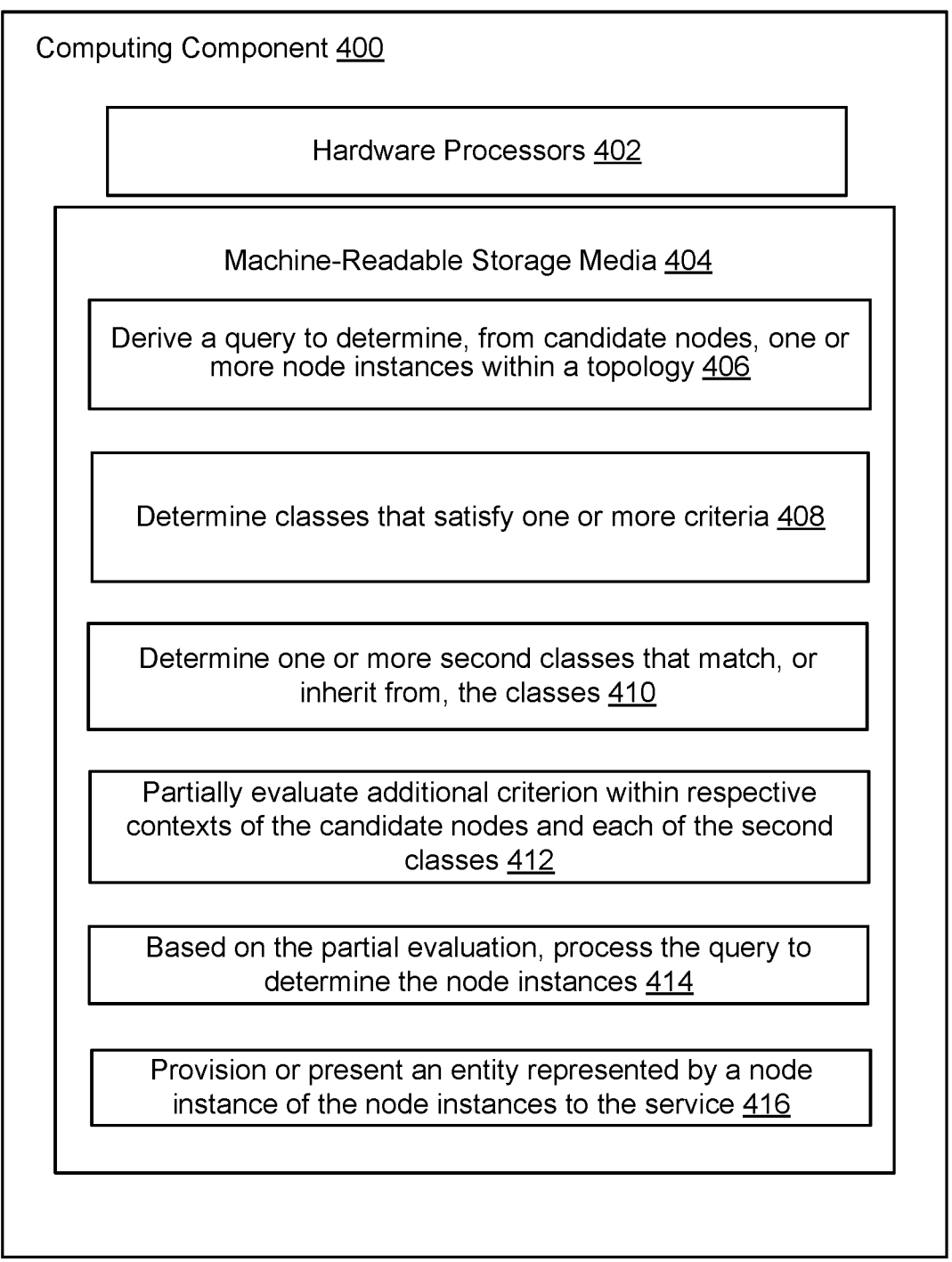
FIG. 4 illustrates a computing component processing queries to resolve dangling requirements, according to examples described in the present disclosure.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of resolving dangling requirements. It should be appreciated that there can be additional, fewer, or alternative steps performed in similar or alternative orders, or in parallel, within the scope of the various examples discussed herein unless otherwise stated. The computing component 400 may be implemented as the computing component 111 of FIGS. 1A, 1B, 1C, 2A, 2B, and 3, which may augment features of an existing platform, in particular, with respect to processing queries. The computing component 400 may include a server. The machine-readable storage media 404 may include suitable machine-readable storage media described in FIG. 6. FIG. 4 summarizes and further elaborates on some aspects previously described, such as, without limitation, generating or formulating a query, and evaluating the query. The evaluation of the query may entail evaluating expressions according to inheritance. The evaluation of the expressions may include evaluating logical expressions, functions, and/or conditions. Any of instructions 406-416, as described below, may implement or be included in logic 113.

The hardware processor(s) 402 may execute instruction 406 stored in the machine-readable storage media 404 to derive a query. The query may be processed or evaluated to determine, from candidate nodes, one or more node instances within a topology that fulfill one or more criteria provided by one or more classes, as well as an additional criterion (e.g., separate from the one or more criteria). The candidate nodes may represent respective entities within the topology from which the entity is to be selected or provisioned. The one or more criteria may include one or more types which indicate one or more classes to be implemented by matching results of the query. For example, if the query specifies a graphics processing unit (GPU), a class that specifies central processing units (CPUs) would not fulfill the criteria of the query.

Meanwhile, the additional criterion may include references to parameters or functions, and/or may include one or more filter expressions. The additional criterion may be evaluated in a context of candidate nodes within the topology, such as, within the database 112 or the cache 116 to determine whether each of the candidate nodes fulfill or satisfy the query. As particular examples, the additional criterion may indicate particular capabilities to be satisfied by the node instances. Capabilities may include, as non-limiting examples, values (e.g., parameters), numbers, names, capacities, and/or indications relating to properties of and/or tasks performed by of the entities represented by the candidate nodes, which may include software and/or hardware entities such as a host or an operating system. The capabilities may be dynamic or static. An example of a dynamic capability may include an operating status of an entity or a capability that is to be evaluated such as current processing power occupied, which may be changing or variable over time. An example of a static capability is an amount of memory, a number of CPUs, or an operating system of an entity.

The capabilities may further include logical expressions indicating a relationship between the parameters, expressions, functions, or conditions, such as "and," "or," "exclusive or," "if," and/or "for." The capabilities may be defined or expressed in accordance with a multitude of computing languages, such as DSD. In some examples, the criteria may originally be in a raw format and be transformed, by the hardware processor(s) 402, into one or more filter expressions to be used to determine whether any of the candidate nodes fulfill the one or more criteria. An exemplary filter expression may include "@eq($_.architecture, $architecture)," according to the DSD language. The filter expression may be evaluated to determine whether an architecture of a candidate computing entity represented by a candidate node "$_.architecture" matches an architecture, "$architecture," of a service for which the computing entity is provisioned, and specified by the query. The hardware processor(s) 402 may return any candidate computing entity which results in the filter expression evaluating to true.

The hardware processor(s) 402 may execute instruction 408 stored in the machine-readable storage media 404 to determine the one or more classes that satisfy the one or more criteria. The classes may include categorizations or classifications of entities based, for example, on parameters of and/or tasks performed by the entities. Example classes 120 and 130 are illustrated in FIGS. 1A, 1B, 1C, and example class 281 is illustrated in FIG. 2A and FIG. 2B. As previously alluded to, the determination of the classes may be based on one or more types to be implemented by matching results of the query. In instruction 408, certain classes that match a type indicated by the query may be selected for further searching. Thus, classes that conflict with or fail to match the type may be disregarded or eliminated for searching purposes, thereby reducing an amount of searching and saving time and computing resources. For example, in a scenario of a query that specifies a GPU, a type may be a GPU. Thus, any classes that specify a non-GPU component, such as a CPU, would be disregarded. If the query includes multiple criteria or types, such as, a first criteria or a first type and a second criteria or a second type, the determination of the classes may include, determining a first set of classes that satisfies the first criteria and a second set of classes that satisfies the second criteria, and determining an intersection of the first set and the second set.

The hardware processor(s) 402 may execute instruction 410 stored in the machine-readable storage media 404 to determine one or more second classes that match, or inherit from, the one or more classes determined in instruction 408. For example, with respect to FIG. 1B, the second classes may include the classes 140, 150, and 160. The class 160 may inherit from multiple classes, in particular, the classes 120 and 140. Multiple inheritance during processing of queries, as described above, is a feature that may be unsupported in other platforms, but improves efficiency of processing queries by eliminating redundant or unnecessary searches. With respect to FIG. 1C, the second classes may include the classes 170 and 180. With respect to FIGS. 2A and 2B, the second classes may include the classes 282, 283, and 284.

The hardware processor(s) 402 may execute instruction 412 stored in the machine-readable storage media 404 to partially evaluate the additional criterion within respective contexts of the candidate nodes and each of the one or more second classes. As an example, referring back to FIG. 1A, if the additional criterion specifies that a number of CPUs is to be between 4 and 10 and that an operating system version is "A1," the hardware processor(s) 402 may obtain one or more classes that include or specify a number of CPUs and/or an operating system version. The classes 120 and 130 may not inherit criteria from other parent classes. In FIG.

1B, the additional criterion is evaluated within a context of each of the second classes 140, 150, and 160. In FIG. 1C, the additional criterion is evaluated within a context of each of the second classes 170 and 180.

For example, referring back to FIG. 1A, the classes 120 and 130 may not specify specific ranges or values of a number of CPUs and an amount of memory. The classes 120 and 130 merely declare an architecture, an operating system type, and an operating system version, without further definitions of the aforementioned. Thus, the hardware processor(s) 402 may evaluate the additional criterion against the second classes.

Referring back to FIG. 1B, the context, or definition, of the second class 140, and candidate nodes therein, specifies that an operating system is of a type "A," and an operating system version falls under any of "A1," "A2," or "A3." Meanwhile, the context, or definition, of the second class 150, and candidate nodes therein, specifies that a number of CPUs is 32, an architecture is of a 64-bit type, and an operating system version falls under any of "A1" or "A2." Therefore, any candidate node in the second class 150 has 32 CPUs. Because the query 118 stipulates that the additional criterion to be satisfied is that a number of CPUs is between 4 and 10, the entire second class 150 would fail to satisfy the criteria. The evaluation of the additional criterion in the context of the second class 150 would return "false." Next, the context, or definition, of the second class 160 specifies that a number of CPUs is 4, an architecture is a 64-bit type, and an operating system version is "A3." Therefore, any entity in the second class 160 has an operating system version of "A3." Because the query 118 stipulates that the additional criterion to be satisfied is that an operating system version is "A1," the entire second class 160 would fail to satisfy the criteria. The evaluation of the additional criterion in the context of the second class 160 would return "false." Therefore, searching within both the second class 150 and the second class 160 may be skipped, thereby conserving computing resources and time.

Referring to FIG. 1C, an evaluation of the additional criterion in the context of the second class 180, and candidate nodes therein, would return "true" because the additional criterion is completely satisfied by the second class 180. Meanwhile, an evaluation of the additional criterion in the context of the second class 170 would return partially true because the operating system version of "A1" specified by the context, or definition, of the second class 170, and candidate nodes therein, matches the operating system version of "A1" specified by the additional criterion. However, some of the candidate nodes within the second class 170 may not satisfy the additional criterion of a number of CPUs being between 4 and 10. Thus, as a result of a partial evaluation, the original query 118 would be reduced to an expression to determine whether or not a number of CPUs, within candidate nodes of the second class 170, is between 4 and 10, without also having to also check or confirm whether the operating system version is "A1."

The evaluations, or partial evaluations, conducted in instruction 412, may set the stage for instruction 414, in which the query 118 is processed by the hardware processor(s) 402 based on the evaluations, or partial evaluations. In particular, the evaluations, or partial evaluations reduce or eliminate redundant or unnecessary searches due to the incorporation of inheritance or multiple inheritance among classes. Determining that a class includes definitions, declarations, or other data that contradicts the additional criterion specified by the query 118 would eliminate a process of searching that class. For example, the hardware processor(s) 402 would refrain from searching the second classes 150 and 160. Meanwhile, determining that a class includes definitions, declarations, or other data that indicates the additional criterion specified by the query 118 would be satisfied, also eliminates a process of searching that class. For example, the hardware processor(s) 402 would refrain from searching the second class 180. Additionally, an extent of a search within the second class 170 would be reduced because one portion of the additional criterion, a number of CPUs, is to be separately considered, without also having to evaluate whether the operating system versions of candidate nodes with the second class 170 satisfies "A1." Thus, an expression that includes a portion of the original query 118 is to be evaluated within the second class 170, rather than an entirety of the original query 118.

In some examples, the additional criterion comprises a filter expression, and the partial evaluation of the additional criterion comprises replacing one or more parameter references in the filter expression with the one or more corresponding parameters specified for the class or the second class, as illustrated in FIGS. 2A and 2B. By such partial evaluation, search may be simplified by reducing a number of evaluations of the criteria and the additional criterion based on respective contexts of the candidate nodes and each of the second classes.

The hardware processor(s) 402 may execute instruction 414 stored in the machine-readable storage media 404 to process the query to determine the node instances, which satisfy the criteria and the additional criterion, based on the partial evaluation. The processing of the query may further include, returning matching results to the query based on a sorting and a limit specified within the query.

The hardware processor(s) 402 may execute instruction 416 stored in the machine-readable storage media 404 to provision or provide an entity represented by a node instance of the node instances to the service. The provisioning may encompass, returning some or a complete list of results that satisfy the query 210, as illustrated in FIG. 3. Additionally, one or more entities represented by the node may be reserved by or delegated to the service. The hardware processor(s) 402 may authenticate the service to obtain permission to utilize the entity. The hardware processor(s) 402 may activate resources, or applications within the entities to execute tasks such as transmitting, analyzing, and/or transforming data. In other examples, the results may be returned to external users, such as humans, for further selection. The results may be manifested in a form of a drop-down list widget in a user interface.

Figure 5:
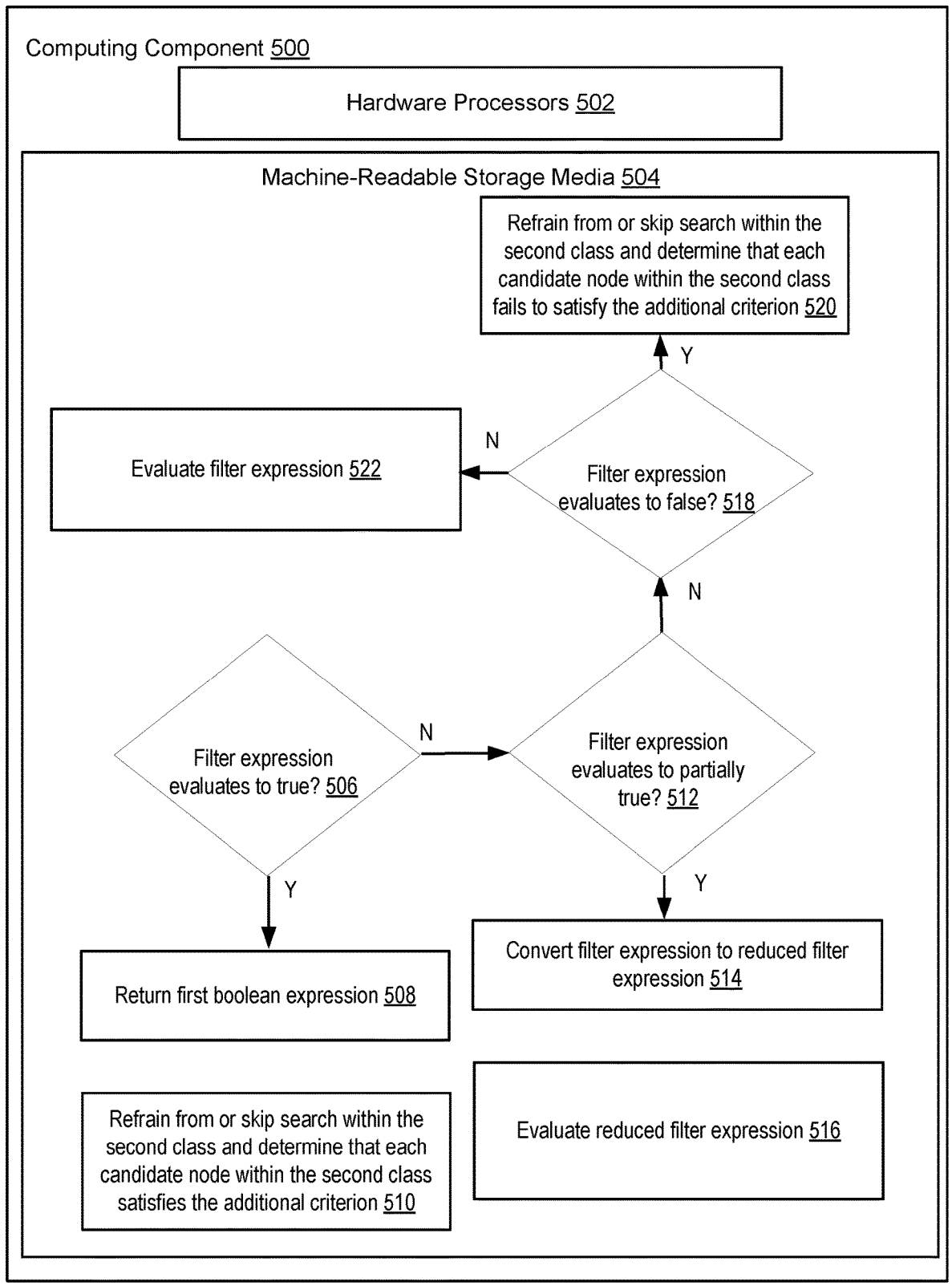
FIG. 5 illustrates a computing component evaluating a filter expression and elaborates on some steps described with respect to FIG. 4.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of resolving dangling requirements. It should be appreciated that there can be additional, fewer, or alternative steps performed in similar or alternative orders, or in parallel, within the scope of the various examples discussed herein unless otherwise stated. The computing component 500 may be implemented as the computing component 111 of FIGS. 1A, 1B, 1C, 2A, 2B, and 3. The computing component 500 may include a server. The machine-readable storage media 504 may include suitable machine-readable storage media described in FIG. 6. FIG. 5 summarizes and further elaborates on some aspects previously described with respect to instructions 412 and 414 of FIG. 4, such as, partial evaluations of expressions. Any of instructions 506-520, as described below, may implement or be included in logic 113.

In FIG. 5, the additional criterion described with respect to FIG. 4 may include a filter expression.

The hardware processor(s) 502 may execute instruction 506 stored in the machine-readable storage media 504 to evaluate a filter expression associated with the additional criterion within a context of a second class. For example, referring back to FIG. 2A, the additional criterion 285 includes a filter expression which is evaluated in the context of the second classes 282, 283, and 284. If the hardware processor(s) 502 determine that the filter expression evaluates to true, then the hardware processor(s) 502 proceed to instruction 508. As another example, in FIG. 1C, the hardware processor(s) 502 may evaluate a filter expression to determine whether candidate nodes within the second classes 170 and 180 satisfy both a number of CPUs being between 4 and 10, and an operating system version being "A1." If both are satisfied, then the hardware processor(s) 502 may execute the instruction 508 stored in the machine-readable storage media 504 to return "true." The filter expression evaluated in the context of the second class 180 does indeed evaluate to "true."

The hardware processor(s) 502 may execute instruction 510 stored in the machine-readable storage media 504 to return a first Boolean expression, such as "true." The hardware processor(s) 502 may determine that each candidate node within the second class satisfies the additional criterion, and thus refrains from or skips the search of individual candidate nodes within the second class.

If, when executing the instruction 506, the hardware processor(s) 502 determine that the entire filter expression does not evaluate to "true," the hardware processor(s) 502 may proceed to instruction 512. As part of the partial evaluation, when executing the instruction 512, the hardware processor(s) 502 may determine whether the filter expression evaluates to partially true. Such a scenario may arise when a first portion of the filter expression evaluates to true but that a second portion of the filter expression is undetermined (e.g., neither evaluates to true nor false). An example of a filter expression evaluating to partially true is illustrated in FIG. 1C, in the second class 170, in which the first portion of the filter expression specifying an operating system as "A1" evaluates to "true" but a second portion of the filter expression specifying a range of CPUs to be between 4 and 10 may or may not be satisfied by candidate nodes within the second class 170. If the hardware processor(s) 502 make a positive determination when executing the instruction 512, the hardware processor(s) 502 may proceed to instruction 514.

The hardware processor(s) 502 may execute instruction 514 stored in the machine-readable storage media 504 to convert the filter expression to a reduced filter expression, which may replace one or more parameter references in the filter expression with the one or more corresponding parameters specified for the class (e.g., parent class) or the second class which inherits from the class. In some examples, the reduced filter expression may remove the first portion that evaluates to "true," while including the second portion. In such a manner, the reduced filter expression may constitute a simplified filter expression within the context of the second class to reduce an amount of searching.

In instruction 516, the hardware processor(s) 502 may evaluate the reduced filter expression in the context of the second class to determine node instances that satisfy the reduced filter expression. Meanwhile, if the hardware processor(s) 502 make a negative determination when executing the instruction 512, the hardware processor(s) 502 may proceed to the instruction 518, in which the hardware processor(s) 502 determine whether the filter expression evaluates to "false." If so, the hardware processor(s) 502 may, in instruction 520, return a second Boolean indicator of "false." For example, the filter expression associated with the additional criterion 285 may evaluate to "false" in the context of the second class 283 in FIG. 2A.

In instruction 520, the hardware processor(s) 502 may further refrain from or skip a search within the second class and determine that each candidate node within the second class fails to satisfy the additional criterion. If the filter expression does not evaluate to false when the hardware processor(s) 502 execute the instruction 518, the hardware processor(s) 502 may proceed to instruction 522 to evaluate the filter expression in the context of the second class. The filter expression in instruction 522 may not be simplified. Although the description refers to second classes, such methods may also be performed on parent classes which do not inherit from any other classes, if the parent classes include sufficient parameters, functions, or other specified data to evaluate against the filter expressions specified by the additional criterion. In such a manner, the hardware processor(s) 502 may skip redundant searches, thereby conserving computing resources and time.

Figure 6:
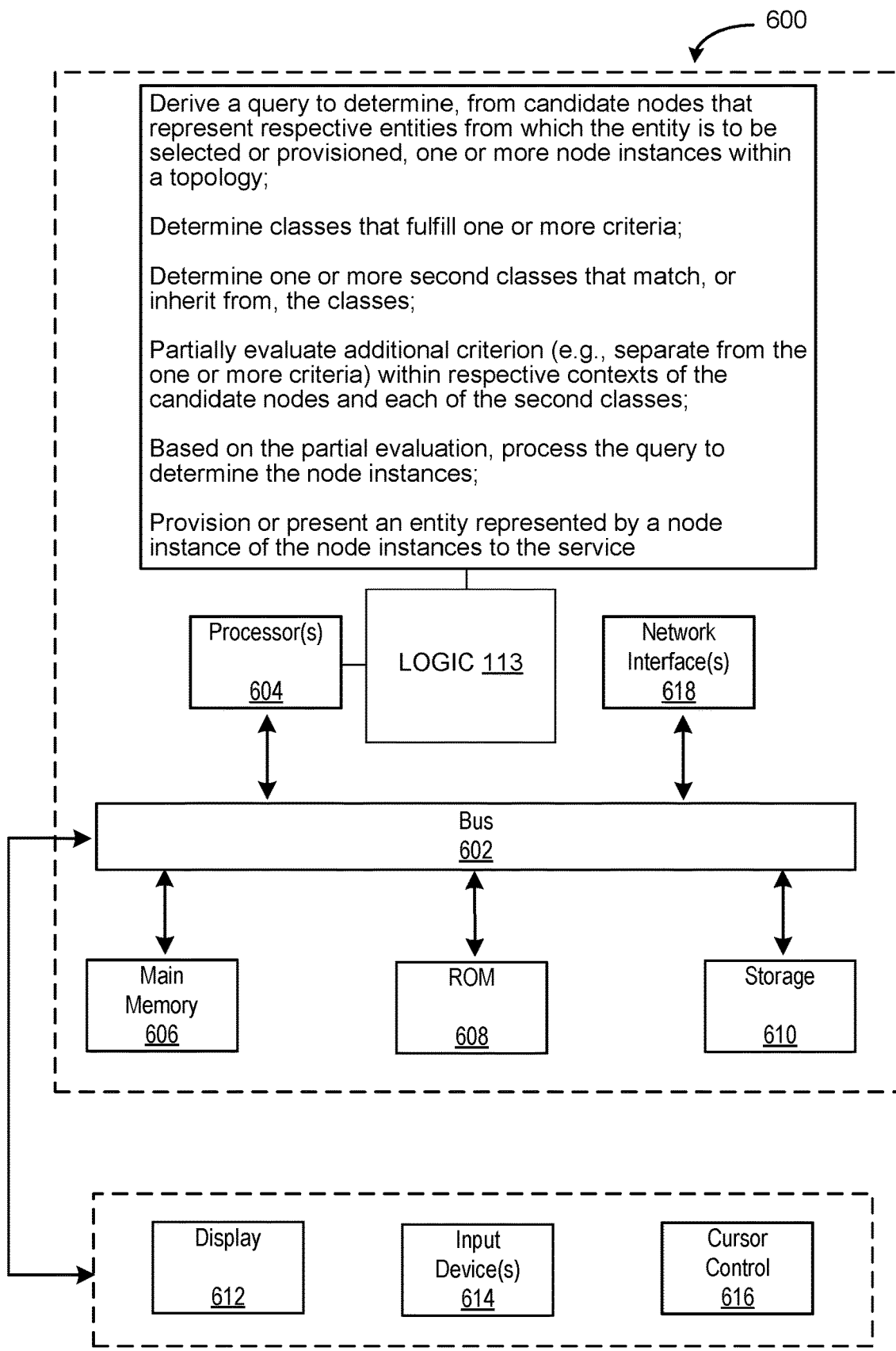
FIG. 6 illustrates an example architecture of a computing component. The architecture of FIG. 6 may be used in a computing component to implement various features of examples described in the present disclosure, including, without limitation, generating, processing, and/or evaluating a query.

FIG. 6 depicts a block diagram of an example computer system 600 in which various of the examples described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. The processor may execute instructions according to the logic 113, as illustrated in any of FIGS. 1A, 1B, 1C, 2A, 2B, 3, 4, and 5. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. In some examples, the computer system 600 may be implemented without any display, input devices, or cursor control. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "component," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" as used outside of actual programming code may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A computer-implemented method, comprising: deriving, based on a service for which an entity is to be selected or provisioned, a query to determine, from candidate nodes that represent respective entities from which the entity is to be selected or provisioned, one or more node instances within a topology that fulfill: one or more criteria provided by one or more classes within the topology; and an additional criterion, wherein the additional criterion comprises a filter expression; determining the one or more classes that fulfill the one or more criteria provided by the one or more classes within the topology; determining one or more second classes that match, or inherit from, the one or more classes; partially evaluating the additional criterion within respective contexts of the candidate nodes and each of the one or more second classes, wherein the partial evaluation of the additional criterion is based on one or more parameters of the service and one or more corresponding parameters specified for a class of the one or more classes or a second class of the one or more second classes, wherein the partial evaluation of the additional criterion comprises replacing one or more parameter references in the filter expression with the one or more corresponding parameters specified for the class or the second class, wherein the partial evaluation further comprises: determining whether the filter expression evaluates to partially true in response to replacing the one or more parameter references in the filter expression; in response to determining that the filter expression evaluates to partially true, converting the filter expression into a reduced filter expression; and evaluating the reduced filter expression based on other unreplaced parameter references within the reduced filter expression, besides the one or more parameter references that were replaced; based on the partial evaluation, processing the query to determine the node instances; and provisioning or presenting an entity represented by a node instance of the node instances to the service.

2. The computer-implemented method of claim 1, wherein the additional criterion comprises static or dynamic capabilities with respect to the service.

3. The computer-implemented method of claim 2, wherein the static or dynamic capabilities of the service are represented in a platform defined based on a programming language that supports single inheritance; and further comprising: reprogramming or redefining the platform to support multiple inheritance.

4. The computer-implemented method of claim 1, wherein the partial evaluation comprises: determining whether the filter expression evaluates to true or false in response to replacing the one or more parameter references in the filter expression; in response to determining that the filter expression evaluates to true or false, returning a first Boolean expression indicating that the additional criterion is satisfied or a second Boolean expression indicating that the additional criterion is violated; refraining from or skipping a search within the second class; and in response to determining that the filter expression evaluates to true, returning candidate nodes within the second class as node instances that satisfy the query.

5. The computer-implemented method of claim 1, wherein the one or more criteria comprises a first criteria and a second criteria; and the determination of the classes comprises: determining a first set of classes that satisfies the first criteria and a second set of classes that satisfies the second criteria; and determining the one or more classes as an intersection of the first set and the second set.

6. The computer-implemented method of claim 1, wherein the derivation of the query is based on one or more parameters of the service.

7. The computer-implemented method of claim 1, wherein the one or more second classes comprise a second class that inherits from multiple classes.

8. A computing system comprising: one or more processors; and a memory storing instructions that, when executed by the one or more processors, cause the one or more processors to: derive, based on a service for which an entity is to be selected or provisioned, a query, or receive, from the service, the query, wherein the query is processed to determine, from candidate nodes that represent respective entities from which the entity is to be selected or provisioned, one or more node instances within a topology that fulfill: one or more criteria provided by one or more classes within the topology; and an additional criterion, wherein the additional criterion comprises a filter expression; determine the one or more classes that fulfill the one or more criteria provided by the one or more classes within the topology; determine one or more second classes that match, or inherit from, the one or more classes; partially evaluate the additional criterion within respective contexts of the candidate nodes and each of the one or more second classes, wherein the partial evaluation of the additional criterion is based on one or more parameters of the service and one or more corresponding parameters specified for a class of the one or more classes or a second class of the one or more second classes, wherein the partial evaluation of the additional criterion comprises replacing one or more parameter references in the filter expression with the one or more corresponding parameters specified for the class or the second class, wherein the partial evaluation further comprises: determining whether the filter expression evaluates to partially true in response to replacing the one or more parameter references in the filter expression; in response to determining that the filter expression evaluates to partially true, converting the filter expression into a reduced filter expression; and evaluating the reduced filter expression based on other unreplaced parameter references within the reduced filter expression, besides the one or more parameter references that were replaced; based on the partial evaluation, process the query to determine the node instances; and provision or present an entity represented by a node instance of the node instances to the service.

9. The computing system of claim 8, wherein the additional criterion comprises static or dynamic capabilities with respect to the service.

10. The computing system of claim 9, wherein the static or dynamic capabilities of the service are represented in a platform defined based on a programming language that supports single inheritance; and the instructions further cause the one or more processors to perform: reprogramming or redefining the platform to support multiple inheritance so that a second class of the one or more second classes inherits from multiple classes.

11. A non-transitory storage medium storing instructions that, when executed by at least one processor of a computing system, cause the computing system to: derive, based on one or more parameters of a service for which an entity is to be selected or provisioned, a query to determine, from candidate nodes that represent respective entities from which the entity is to be selected or provisioned, one or more node instances within a topology that fulfill: one or more criteria provided by one or more classes within the topology; and an additional criterion, wherein the additional criterion comprises a filter expression; determine the one or more classes that fulfill the one or more criteria provided by the one or more classes within the topology; determine one or more second classes that match, or inherit from, the one or more classes; partially evaluate the additional criterion within respective contexts of the candidate nodes and each of the one or more second classes, wherein the partial evaluation of the additional criterion is based on one or more parameters of the service and one or more corresponding parameters specified for a class of the one or more classes or a second class of the one or more second classes, wherein the partial evaluation of the additional criterion comprises replacing one or more parameter references in the filter expression with one or more corresponding parameters specified for the class or the second class, wherein the partial evaluation further comprises: determining whether the filter expression evaluates to partially true in response to replacing the one or more parameter references in the filter expression; in response to determining that the filter expression evaluates to partially true, converting the filter expression into a reduced filter expression; and evaluating the reduced filter expression based on other unreplaced parameter references within the reduced filter expression, besides the one or more parameter references that were replaced; based on the partial evaluation, process the query to determine the node instances; and provision or present an entity represented by a node instance of the node instances to the service.

12. The non-transitory storage medium of claim 11, wherein the partial evaluation comprises: determining whether the filter expression evaluates to true or false in response to replacing the one or more parameter references in the filter expression; in response to determining that the filter expression evaluates to true or false, returning a first Boolean expression indicating that the additional criterion is satisfied or a second Boolean expression indicating that the additional criterion is violated; refraining from or skipping a search within the second class; and in response to determining that the filter expression evaluates to true, returning candidate nodes within the second class as node instances that satisfy the query.

13. The non-transitory storage medium of claim 11, wherein the one or more criteria comprises a first criteria and a second criteria; and the determination of the classes comprises: determining a first set of classes that satisfies the first criteria and a second set of classes that satisfies the second criteria; and determining the one or more classes as an intersection of the first set and the second set.

* * * * *